(12) United States Patent
Hofmann et al.

(10) Patent No.: US 6,386,612 B2
(45) Date of Patent: May 14, 2002

(54) UNDER SEAT STORAGE SYSTEM

(75) Inventors: Karen M. Hofmann, Glendale; Michael E. Wiedeman, Manhattan Beach, both of CA (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/755,605

(22) Filed: Jan. 5, 2001

Related U.S. Application Data

(60) Provisional application No. 60/175,091, filed on Jan. 7, 2000.

(51) Int. Cl.[7] .................................................. B60N 3/12
(52) U.S. Cl. ..................... 296/37.15; 296/37.6; 224/275
(58) Field of Search ............................. 296/37.15, 37.6; 297/188.17, 188.1; 224/275; 312/235.2; 348/148

(56) References Cited

U.S. PATENT DOCUMENTS

| | | | | |
|---|---|---|---|---|
| 1,179,445 A | * | 4/1916 | Manning | 296/37.15 |
| 3,058,771 A | * | 10/1962 | Hill et al. | 296/37.15 |
| 3,625,347 A | * | 12/1971 | Trammell, Jr. | 224/275 |
| 3,779,597 A | * | 12/1973 | Uchida | 296/37.15 |
| 4,131,313 A | * | 12/1978 | Jacobs | 224/275 |
| 4,841,661 A | * | 6/1989 | Moore | 222/130 |
| 4,883,317 A | * | 11/1989 | Davenport | 297/188.1 |
| 5,628,438 A | * | 5/1997 | Legrow | 224/275 |
| 5,902,009 A | * | 5/1999 | Singh et al. | 296/37.15 |
| 5,934,615 A | * | 8/1999 | Treichler et al. | 312/248 |
| 5,967,602 A | * | 10/1999 | Ptak et al. | 296/37.15 |
| 6,074,000 A | * | 6/2000 | Wagner | 312/235.2 |
| 6,095,532 A | * | 8/2000 | Martin | 280/30 |
| 6,102,463 A | * | 8/2000 | Swanson et al. | 296/37.15 |
| 6,106,044 A | * | 8/2000 | Schlachter | 296/37.15 |
| 6,161,896 A | * | 12/2000 | Johnson et al. | 297/188.1 |
| 6,215,518 B1 | * | 4/2001 | Watkins | 296/37.6 |

FOREIGN PATENT DOCUMENTS

JP    10 278643    * 10/1998

* cited by examiner

*Primary Examiner*—Ken Patel
(74) *Attorney, Agent, or Firm*—Foley & Lardner

(57) ABSTRACT

An assembly for providing additional storage in a vehicle includes a drawer housing located beneath a rear seat of a vehicle. The housing may serve as a coupling location for the seat cushion and includes front and back walls and cross beams which define side openings on either side of the vehicle. A drawer fits within the housing and may be opened from either side. In a preferred embodiment, the assembly also includes a load floor coupled to the drawer housing and movable between a generally vertical position in which access to the drawer is facilitated and a lowered position where it supports the cushion of the seat or, if desired, the seat back in a folded position. The drawer may slide across the floor of the vehicle or, in the preferred and illustrated embodiment, include rails which cooperate with grooves on the front and back walls of the drawer housing to facilitate easy sliding of the drawer.

18 Claims, 5 Drawing Sheets

UNDER SEAT STORAGE SYSTEM

CROSS-REFERENCE TO RELATED APPLICATIONS, IF ANY:

This application claims priority from provisional U.S. patent application Ser. No. 60/175,091, filed Jan. 7, 2000, and entitled "Vehicle Components Including an Extension System, A Tie-Down System, A Seat Assembly, A Coat Rod, A Container System, A Front Console System, and A Rear Console System."

BACKGROUND OF THE INVENTION

1. Field of the Invention

The present invention relates generally to the field of storage systems for vehicles and more particularly to a system for enhancing the amount of storage space available in a vehicle by using a slidable drawer beneath a seat. In the preferred and illustrated embodiment, the invention relates to the field of providing a beneath-the-seat storage system especially suitable for the second row of vans, SUVs and the like.

2. Description of the Prior Art

Vehicles including automobiles, vans, sports utility vehicles and sports utility trucks include a variety of storage locations in addition to the cargo areas or trunks thereof. These include glove boxes, pockets on doors and seat backs, consoles (either in the headliner or between seats), compartments within the trunk or cargo area and the like. While many of these storage locations increase the total amount of storage available to the driver and occupants of the vehicle, there is an ever increasing need for more storage, especially as vehicles play more important roles in the recreation and work related aspects of people's lives. Optimization of storage space in a way which does not involve substantial modifications to the vehicle would be especially beneficial. A drawer storage system which is located under the second row seat of a vehicle, which is accessible from either side, and which could be constructed without substantial design changes for the seat cushion or seat back would represent a substantial improvement in this art.

FEATURES AND SUMMARY OF THE INVENTION

A primary feature of the present invention is to provide a large volume of under seat storage for vehicles.

Another feature of the present invention is to provide an underseat storage system which may be accessed from either side of the vehicle by movement of one or more drawers in a direction transverse to the vehicle axis.

A different feature of the present invention is to provide a drawer housing for a storage drawer which acts as a support for at least one of the seat components, i.e., the seat cushion or the seat back.

Yet a further feature of the present invention is to provide an under seat storage system which includes a pivotal load floor which covers the top of the drawer and which may be raised to permit access to the drawer contents from the top, or which may, in the event the vehicle has a folding rear seat, support the seat back in its lowered position.

Yet another feature of the present invention is to provide an under seat drawer storage system for a vehicle in which sliding movement of the drawer is facilitated using rails and grooves.

How the foregoing and other features of the invention are accomplished, collectively, individually or in various subcombinations, will be explained in the following detailed description of the preferred embodiment taken in conjunction with the drawings. Generally, they are accomplished by using a drawer housing having a front wall and a rear wall and at least two cross beams extending from the upper portions thereof to define side openings for the housing. The vehicle seat cushion(s) may be coupled in a pivotal manner to the top of the front wall, as can a load floor. If the seat is of the folding variety, the drawer may be accessed by pivoting the seat cushion to an upright position, pivoting the load floor to a vertical position and accessing the drawer from the top. Alternatively, the drawer may be accessed by pulling it outwardly through either of the side openings. The drawer may be divided for organizational purposes, and separate drawers may be provided for the right and left side of the vehicle if desired.

If the seat back of the vehicle is of the type which can be folded to a horizontal position to increase the size of the vehicle cargo floor, the seat cushion is pivoted upwardly and the seat back is pivoted downwardly to reside on the load floor.

To facilitate easy sliding of the drawer from the drawer housing, rails may be provided on an upper end of the drawer and cooperate with grooves located on the inner surfaces of the front and rear walls of the drawer housing.

Other ways in which the features of the invention are accomplished will become apparent to those skilled in the art after they have read the following specification. Such other ways are deemed by the present inventors to fall within the scope of the present invention if they fall within the scope of the claims which follow.

BRIEF DESCRIPTION OF THE DRAWINGS

In the various drawings, like reference numerals are used to indicate like components.

DETAILED DESCRIPTION OF THE PREFERRED EMBODIMENT

Figure 1:
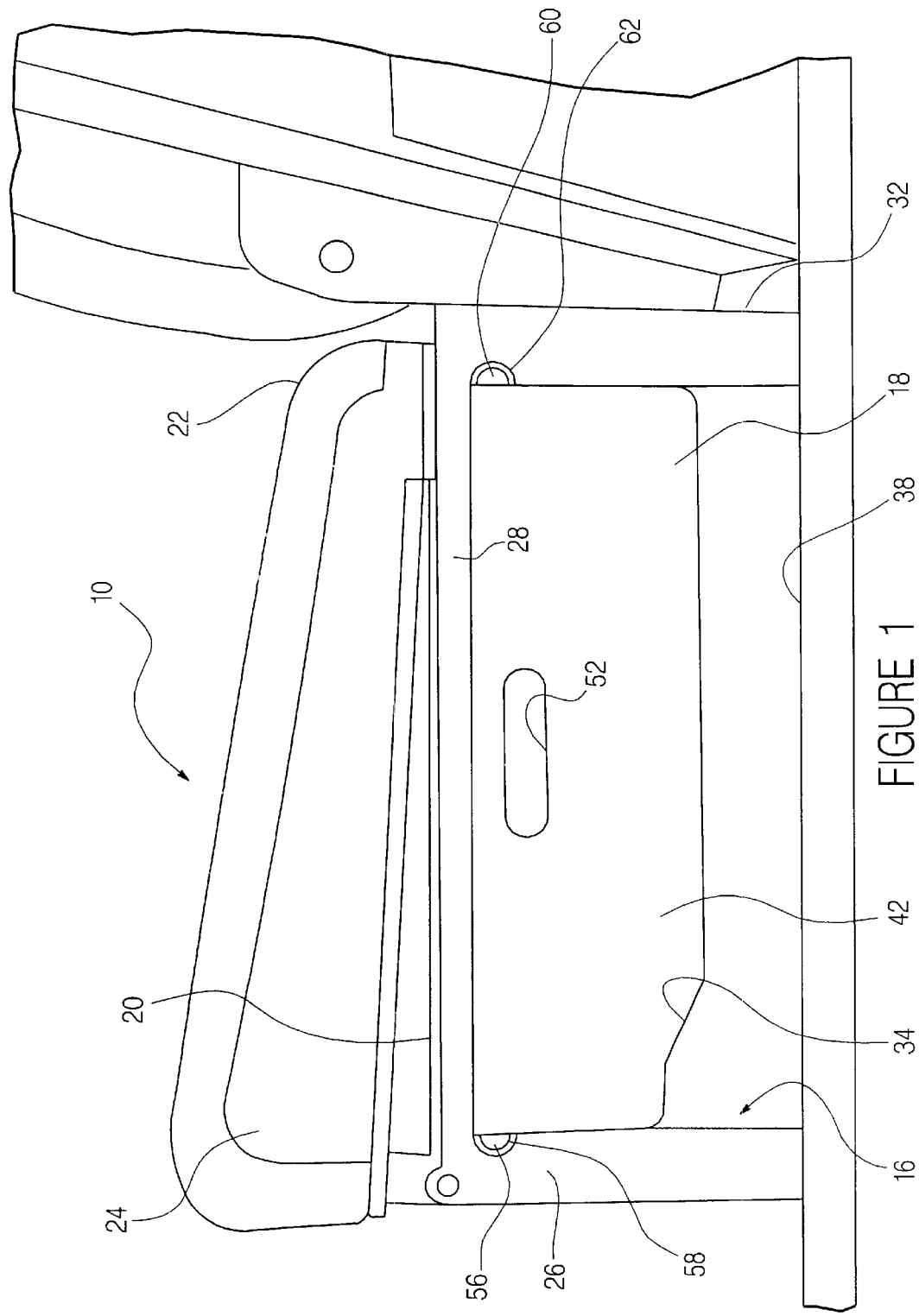
FIG. 1 is a side view of the seat storage system of the present invention.

Before beginning the detailed description of the preferred embodiment, several general comments are warranted about the applicability and scope of the present invention.

First, the seat storage system of the present invention is disclosed in connection with a split rear seat for a van having a generally flat floor and a seat division of approximately 60:40. The seat storage system may be used with seats having other configurations, including bench seats and with seats which do not fold in any manner. In such seats, the load floor described later herein would not be required.

Second, rails and grooves are illustrated as one technique of facilitating drawer movement from a stored position to an extended position. Other drawer hardware can be used, such as that used in cabinetry and other furniture.

Third, a single drawer is shown in the Figures, but two separate drawers could be used, one accessed from each side of the vehicle. A single drawer may also be accessed from either side.

Fourth, the drawer is shown with an open top and with various walls subdividing it for organizational purposes. The drawer could be closed at the top and could be subdivided by any number of walls extending perpendicular or parallel to the front and back walls of the drawer.

Fifth, handle opening is shown in the drawer, but pulls or the like could be provided to facilitate movement of the drawer from a stored to an extended position.

Sixth, the illustrated embodiment shows the seat cushion hinged to a front wall of a drawer housing. The seat could be hinged to other structural components of the vehicle, and the drawer housing can be independent of any seat folding component.

Seventh, the materials used to construct the drawer housing and the drawer can be selected from a wide variety of structural materials. The drawer housing preferably is constructed of metal to provide structural integrity. The drawer, on the other hand, is preferably constructed from lighter weight materials such as medium density fiberboard, aluminum, various plastic resins, and the like.

Eighth, the number of cross beams extending between the front and back walls of the drawer housing can also be variously embodied. Two are shown, but additional beams may be used for enhancing the robustness of the system.

Ninth, the drawer itself can rest on the floor of the vehicle and slide thereon without the need for rails and grooves, but the latter are preferred and avoid problems which could be encountered if the bottom of the drawer slides along the floor of the vehicle where contaminants or various vehicle components might be present.

Finally, the load floor is also shown coupled to the front wall of the drawer housing in the illustrations. It will apparent from a review of the drawings, that the load floor could also be positioned and rotatably mounted to the rear wall of the drawer housing and still be capable of movement to a vertical and a storage position. Such mounting of the load floor on the rear wall would not interfere with the load floor continuing to serve as a support for the rear seat when it is folded into a horizontal storage position.

As shown in FIG. 1, the seat assembly 10 of the invention includes a drawer housing 16, a storage drawer 18, a load floor 20, a seat back 22, and a seat cushion 24. Although the seat assembly 10 has been specifically designed for a van-like or truck-like vehicle, the seat assembly 10 may be used with any vehicle to increase cargo room.

Figure 2:
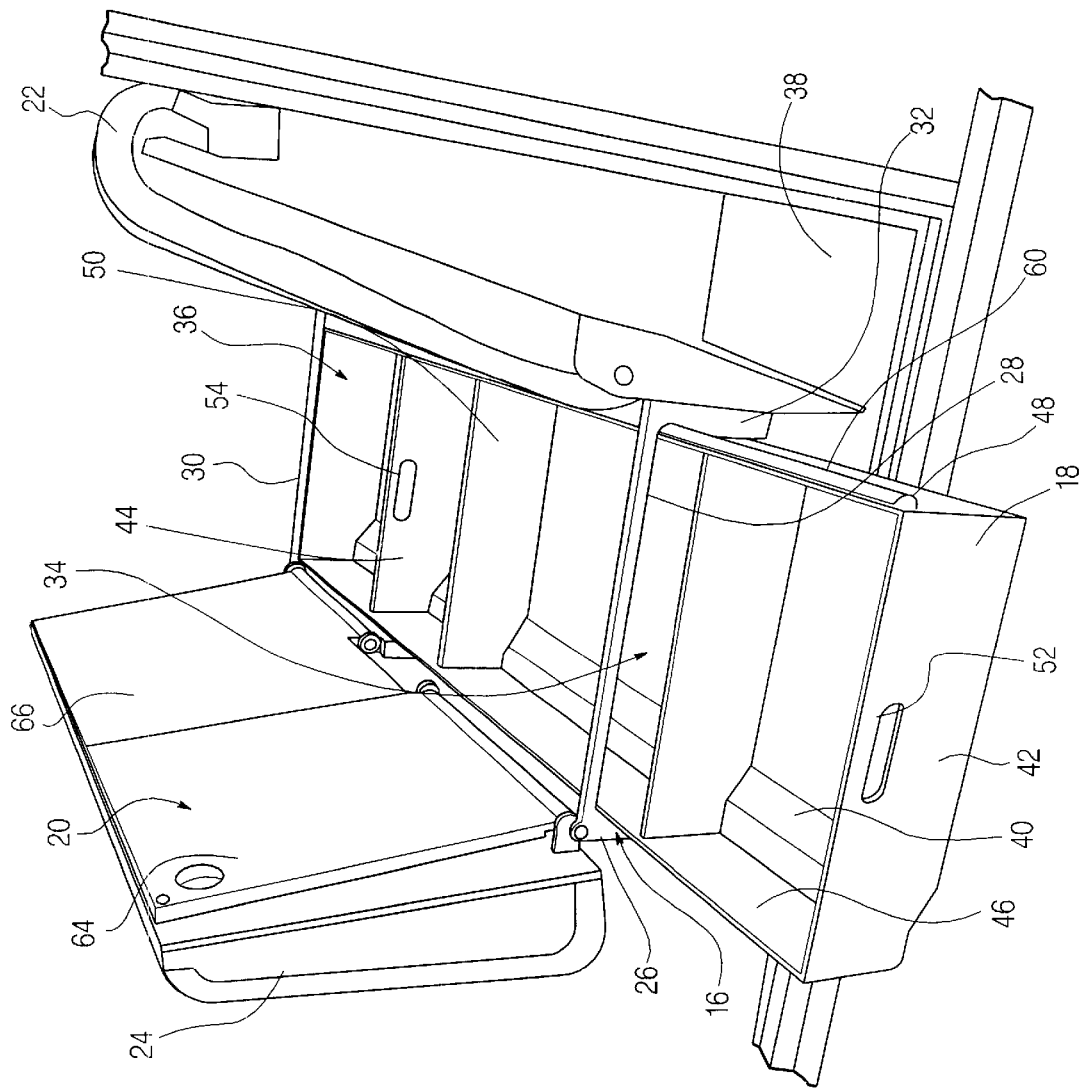
FIG. 2 is a perspective view of the seat storage assembly of the present invention, shown with the storage drawer in an extended position, with a seat cushion rotated to a vertical position and with a load floor in an open position.

As shown in FIGS. 1 and 2, the drawer housing 16, which functions as a connector for the storage drawer 18 and as an anchor for the seat cushion 24 and the load floor 20, includes a front wall 26, a left beam 28, a right beam 30, and a rear wall 32. In the preferred embodiment, the drawer housing 16 extends nearly the entire width of the vehicle and preferably includes a left opening 34 and a right opening 36. In an alternative embodiment, the drawer housing 16 may extend only a portion of the width of the vehicle, and may include only one opening. The drawer housing 16 is preferably fastened to a floor surface 38 of the vehicle with several fasteners (not shown), such as bolts, screws, adhesives, or any other suitable devices. Alternatively, the drawer housing 16 may be formed as an integral part of the floor surface 38 of the vehicle. The drawer housing 16 is preferably formed from a hardened steel and its front and back walls are solid stampings. However, perforate or lattice fabrications may be used for weight reduction.

The storage drawer 18, which functions to store cargo, is connected to the drawer housing 16 for slidable movement. The storage drawer 18 includes a bottom surface 40, a left surface 42, a right surface 44, a front surface 46, and a rear surface 48. In the preferred embodiment, the storage drawer 18 does not include a top. In an alternative embodiment, the storage drawer 18 may include a top that is temporarily connected, pivotally connected, or permanently fastened to the storage drawer 18.

The storage drawer 18 preferably includes one or more partition walls 50 that aid in the organization of the cargo within the storage drawer 18. In the preferred embodiment, the storage drawer 18 extends the entire width of the drawer housing 16, while in an alternative embodiment, the storage drawer 18 may extend only a portion of the drawer housing 16, or as mentioned earlier, two drawers may fit within housing 16. The left surface 42 and the right surface 44 of the illustrated drawer 18 are preferably designed to correspond with the left opening 34 and the right opening 36 of the drawer housing 16. In this manner, when the storage drawer 18 is slid into a storage position (shown in FIG. 1), the left surface 42 and the right surface 44 are flush with the drawer housing 16. The left surface 42 and the right surface 44 preferably include a left handle 52 and a right handle 54, respectively. The left handle 52 and the right handle 54 function to allow easy pulling or pushing of the storage drawer 18 within the drawer housing 16.

The storage drawer 18 preferably includes a front rail 56, which corresponds with a front groove 58 in the front wall 26 of the drawer housing 16, and a rear rail 60, which corresponds with a rear groove 62 in the rear wall 32 of the drawer housing 16. The front rail 56, the front groove 58, the rear rail 60, and the rear groove 62 cooperate to allow for sliding movement of the storage drawer 18 within the drawer housing 16. The front rail 56 and the rear rail 60 are preferably formed preferably formed from a hardened steel, but may alternatively be formed from other suitable materials.

Figure 3:
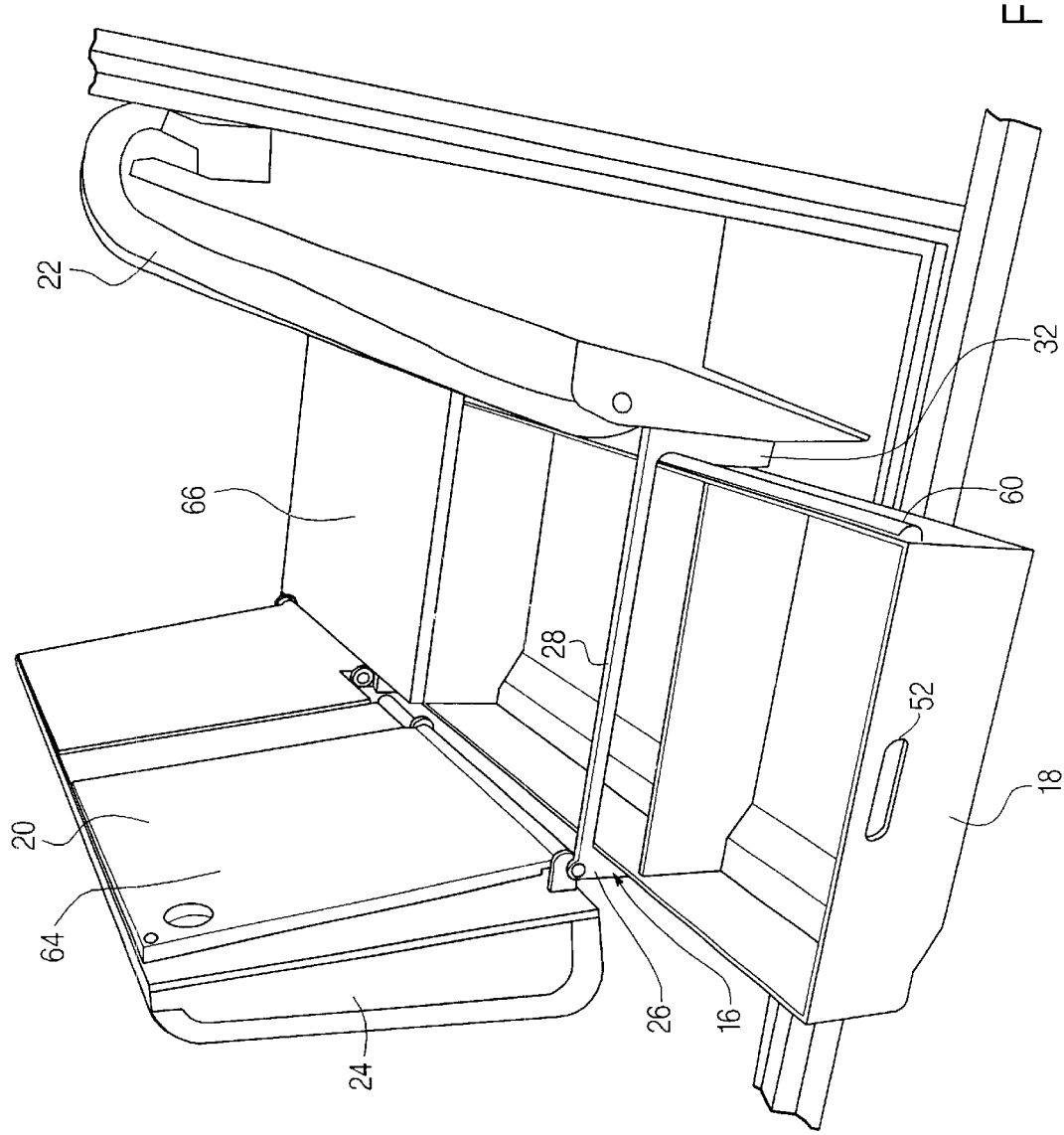
FIG. 3 is a perspective view of the seat assembly of the invention, shown with a right section thereof in a closed position and the nearer left section in an open position.
Figure 4:
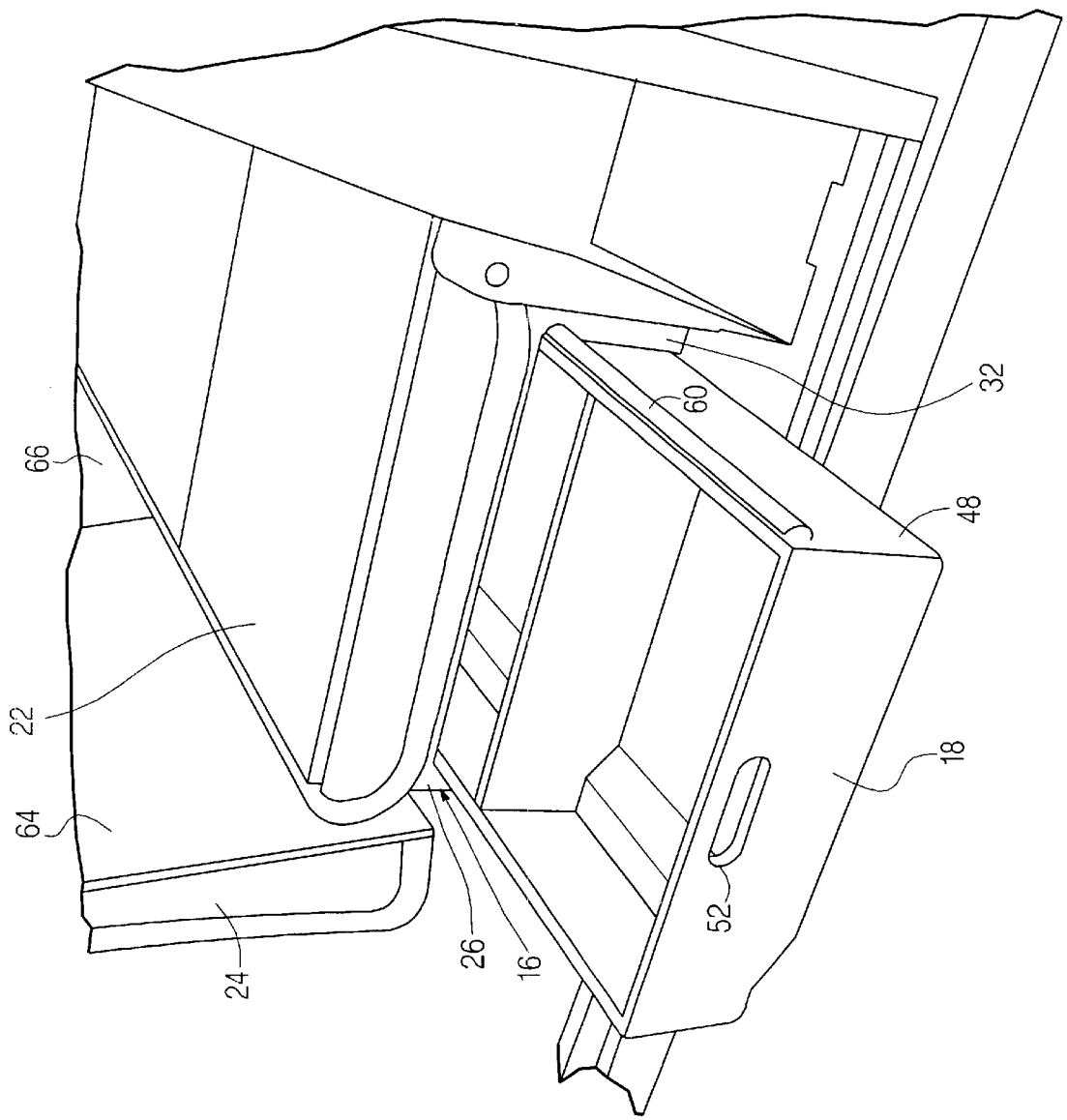
FIG. 4 is a perspective view of the seat assembly, shown in FIG. 1, with the seat back in a folded position.
Figure 5:
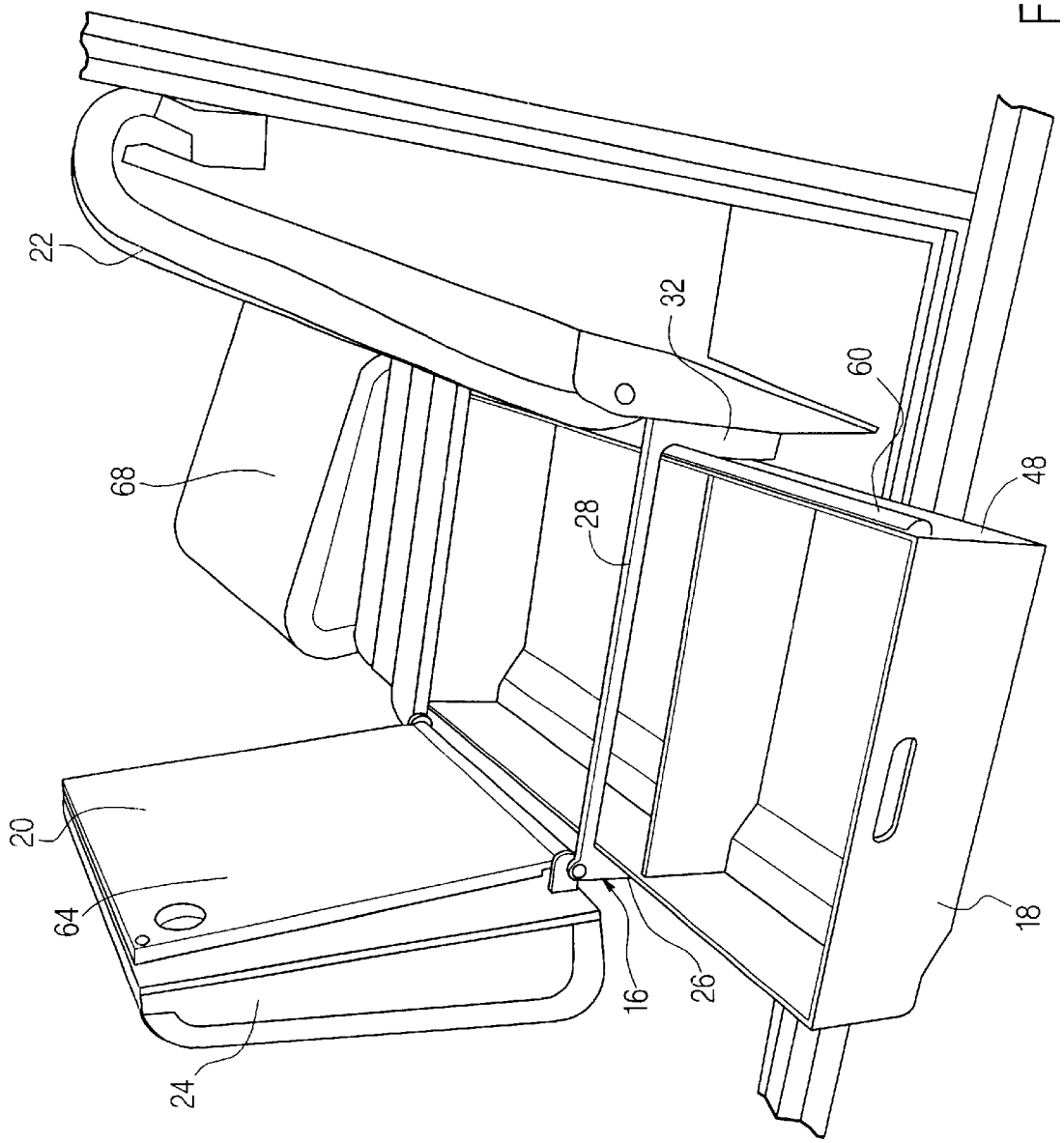
FIG. 5 is a perspective view of the seat assembly, shown with a seat cushion of an opposing seat in a use position.

As shown in FIGS. 2 and 3, a load floor 20 extends from the front wall 26 to the rear wall 32 of the drawer housing 16 and is preferably connected to the front wall 26 for pivotal movement between an open position (shown in FIG. 2) and a closed position (shown in FIG. 3). The load floor 20 functions to cover the storage drawer 18 and to support the seat back 22 when the seat back 22 is pivoted into a folded position (shown in FIG. 4). In the preferred embodiment, the load floor 20 includes a left section 64 and a right section 66, which allows the left section 64 to be pivoted into the open position and the right section 66 to be pivoted into the closed position (and vice versa) and, more importantly, allows access to the storage drawer 18 from an opposing seat 68, as shown in FIG. 5. The load floor 20 is preferably formed from a hard plastic or fiberboard.

The seat cushion 24, which provides support for a passenger, is connected to the drawer housing 16 for pivotal movement between a use position (shown in FIG. 1) and a raised position. Likewise, the seat back 22, which also provides support for the passenger, is connected to the vehicle for pivotal movement between a use position and a folded position (shown in FIG. 4). The seat cushion 24 and the seat back 22 are preferably formed with a left portion and a right portion (in an approximate 40/60 split), but may be formed with other ratios or as a single bench seat.

While the present invention has been illustrated with five FIGURES and the description above, it is not to be limited thereto but is to be limited solely by the scope of the claims which follow.

What is claimed is:

1. A storage assembly for a vehicle and adapted to be placed beneath a seat cushion comprising:
   a drawer housing comprising a front wall and a rear wall spaced apart therefrom;
   at least one seat cushion pivotally connected to the front wall of the drawer housing for movement between a lowered position for use by an occupant and a raised position providing access to the space between the front wall and the rear wall;
   a side opening into the space; and
   a drawer slidably disposed in the space, the drawer being movable through the side opening.

2. The storage assembly of claim 1 wherein at least one beam connects the top of the front wall to the top of the back wall and defines the top of a side opening.

3. The storage assembly of claim 1, wherein the drawer includes a pair of rails and the drawer housing includes a pair of grooves, the rails being slidably disposed in the grooves to facilitate movement of the drawer with respect to the drawer housing.

4. The storage assembly of claim 3 wherein the grooves extend along an upper inside portion of the front wall and an upper inside portion of the back wall.

5. The storage assembly of claim 4 wherein the drawer includes front and back walls, a bottom and first and second ends, the rails being located along an upper outside portion of the front wall and an upper outside portion of the back wall.

6. The storage assembly of claim 5 wherein the drawer includes at least one divider wall extending between the front and back wall of the drawer and spaced from the ends thereof.

7. The storage assembly of claim 1 further including a load floor movable between a closed position in which it covers the drawer and a raised position in which access is provided to the drawer.

8. The storage assembly of claim 7 wherein the load floor is pivotally coupled to the front wall of the drawer housing.

9. The storage assembly of claim 7 further including a seat back rotatable between a lowered position supported by the load floor and an upper position for use by an occupant.

10. The storage assembly of claim 1 wherein the seat cushion is a split seat heaving two seat cushions and two seat backs.

11. The storage assembly of claim 8 wherein there are two seat cushions, and two seat backs corresponding, and wherein the load floor is split, whereby the drawer may be accessed through either load floor when a load floor is in its raised position or by removal of the drawer.

12. A vehicle having one or more front seats and a rear seat storage assembly, the rear seat storage assembly including at least one seat cushion and seat back, each seat cushion and seat back being rotatable between use positions by an occupant and a raised position for the seat cushion and a folded position for the seat back, the rear seat assembly including a drawer housing enclosing a drawer, the drawer being slidably removable from the drawer housing in a transverse direction with respect to the vehicle axis, and wherein the seat cushion is rotatably mounted to the drawer housing.

13. The vehicle of claim 12 wherein the drawer housing extends beneath each rear seat, has front and back walls and beams connecting the tops of the front and back walls at either end thereof, a pair of side openings to the drawer housing being defined by the front and back walls, and the beams and the floor of the vehicle, the drawer being slidably disposed within the drawer housing for movement through a side opening.

14. The vehicle of claim 13 wherein the drawer includes a pair of rails and the drawer housing includes a pair of grooves, the rails being slidably disposed in the grooves to facilitate movement of the drawer with respect to the drawer housing.

15. The vehicle of claim 14 wherein the grooves extend along an upper inside portion of the front wall and an upper inside portion of the back wall.

16. The vehicle of claim 15 wherein the drawer includes front and back walls, a bottom and first and second ends, the rails being located along an upper outside portion of the front wall and an upper outside portion of the back wall.

17. The vehicle of claim 12 further including a load floor movable between a closed position in which it covers the drawer and a raised position in which access is provided to the drawer.

18. The vehicle of claim 17 wherein the load floor is pivotally coupled to the front wall of the drawer housing.

* * * * *